United States Patent [19]

Tsukamoto et al.

[11] 4,330,592
[45] May 18, 1982

[54] COMPOSITE MATERIALS OF STEEL CORDS AND RUBBER AND A METHOD OF PRODUCING THE SAME

[75] Inventors: Takehiro Tsukamoto, Higashimurayama; Michitaka Takeshita, Mitaka; Seisuke Tomita, Higashimurayama, all of Japan

[73] Assignee: Bridgestone Tire Company Limited, Tokyo, Japan

[21] Appl. No.: 166,515

[22] Filed: Jul. 7, 1980

[30] Foreign Application Priority Data

Jul. 6, 1979 [JP] Japan .................. 54-857241

[51] Int. Cl.³ .............................................. B60C 9/00
[52] U.S. Cl. .................................. 428/378; 152/359; 156/110 A; 156/124; 428/467
[58] Field of Search ............... 156/110 A, 124, 334, 156/338; 152/330 R, 359; 428/378, 380, 383, 467; 427/334, 409, 416, 434

[56] References Cited

U.S. PATENT DOCUMENTS

| | | | |
|---|---|---|---|
| 3,630,259 | 12/1971 | Brignac | 152/359 |
| 3,754,942 | 8/1973 | Moradian | 428/467 |
| 4,169,112 | 9/1979 | Elmer et al. | 260/762 |
| 4,182,639 | 1/1980 | Pignocco et al. | 156/124 X |
| 4,189,332 | 2/1980 | Rye et al. | 156/124 X |
| 4,192,694 | 3/1980 | Rye | 156/124 X |

*Primary Examiner*—John E. Kittle
*Attorney, Agent, or Firm*—Sughrue, Mion, Zinn, Macpeak and Seas

[57] ABSTRACT

A composite material of steel cords and rubber having improved corrosion fatigue resistance and fretting fatigue resistance and a method of producing the same are disclosed. The composite material is produced by bonding rubber to steel cords through vulcanization. Before the vulcanization, steel cords are treated with a rust preventing material consisting of at least one particular surfactant and at least one particular film-former to form a protect layer on the surface of the steel cord.

2 Claims, 1 Drawing Figure

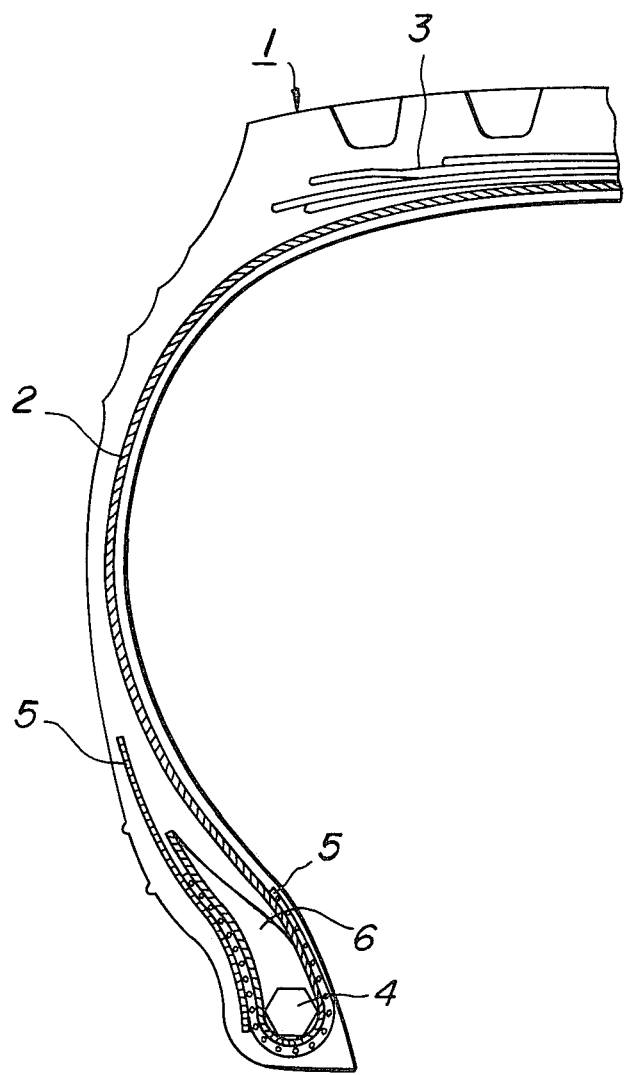

COMPOSITE MATERIALS OF STEEL CORDS AND RUBBER AND A METHOD OF PRODUCING THE SAME

This invention relates to composite materials of steel cords and rubber, and more particularly to composite materials for use in pneumatic tires, belts, hoses and the like and a method of producing the same by integrally bonding rubber to steel cords having improved corrosion fatigue resistance and fretting fatigue resistance and a good adhesion to rubber through vulcanization.

Heretofore, rubber articles reinforced with steel cords, such as pneumatic tires, belts, hoses and the like have such a drawback that when they are particularly used in corrosive atmosphere, rust occurs in steel cords to cause deterioration of adhesion between steel cord and rubber, rupture of steel cord and the like and as the result these articles can be used no further. As a cause of producing rust, there are known rust produced in the storage of steel cords, rust caused by penetrating rainwater or the like from external injuries into the inside of the article, rust caused by a gas generated in the vulcanization of rubber, rust resulting from the fact that water contained in rubber is converted into steam due to heat generation during the running of the article, and the like.

Therefore, various attempts have hitherto been made in order to prevent the occurrence of rust. Among them, a process for applying a rust preventive on steel cords is lately watched because it hardly exerts on the productivity, to which are made some proposals. In the steel cord coated with such a rust preventive, the occurrence of rust can certainly be prevented, but the initial adhesion to rubber lowers and the rust preventing performance is poor, so that the application of the rust preventive is not yet put to practical use. For instance, there is described in Japanese patent application Publication No. 43,875/76 and No. 24,626/77 that an ester of trimellitic acid is used as a rust preventive. However, such an ester is liquid at room temperature, so that it is removed by the fretting of filaments owing to easy flow behavior in the rubber articles used under dynamic conditions, for example, pneumatic tires and the like. As a result, the use of the above ester has such a drawback that the rust preventing performance and abrasion resistance are poor.

On the other hand, steel cords widely used as a reinforcement for rubber articles have a so-called strand construction formed by twisting of two or more strands, each strand being formed by twisting of two or more wire filaments, in view of the easiness of production. In the steel cord of this type, however, fatigue due to fretting comes into question because the filaments in the cord mutually come into contact with each other at a point. Therefore, there is a serious drawback that the steel cords can be used no longer due to troubles resulting from the above fatigue before the completion of design life of the article.

The inventors have made various studies in order to solve the above mentioned drawbacks and found out that when using a rust preventive lubricant consisting of a surfactant having a rust preventing performance and a film-former composed essentially of a hydrocarbon polymer or an oxide thereof having a softening or melting point of not less than 30° C. such as wax, petrolatam and the like, the film-former forms a film on the surfactant covering the steel cords, i.e. on the lipophilic group side of the surfactant owing to the poor wettability against steel cord, whereby the rust preventing performances, particularly rust preventing performance under dynamic conditions are considerably improved and at the same time the fretting fatigue resistance is increased owing to the presence of the resulting film. Furthermore, it has been found out that the film does not obstruct the diffusion of sulfur participating in the adhesion reaction of rubber into steel cord surface at all because a part of the film dissolves and diffuses into rubber during the vulcanization. As a result, the invention has been accomplished.

According to the invention, there is the provision of a composite material of steel cords and rubber having improved corrosion fatigue resistance and fretting fatigue resistance and a method of producing the same, comprising providing on a surface of said steel cord a protect layer of a rust preventing material consisting of at least one surfactant selected from organic carboxylic acids, metal salts of organic carboxylic acids, metal salts of organic sulfonic acids, organic sulfates, aliphatic amines, alkanol amines, alkanol amides of fatty acids, fatty acid esters, glycerol esters, metal salts of phosphoric acid, phosphoric acid esters, amine salts of phosphoric acid, metal salts of hydrocarbon polymer oxides, benzotriazol derivatives, aliphatic ketones, imidazole derivatives, benzimidazole derivatives and amino acids, and at least one film-former selected from hydrocarbon polymers and oxides thereof having a softening or melting point of not less than 30° C. before vulcanization bonding of rubber to said steel cords.

As to the surfactant used in the invention, the organic carboxylic acids include aliphatic, alicyclic and aromatic mono- and poly-valent carboxylic acids, an example of which is stearic acid, octylic acid, naphthenic acid, oleic acid, abietic acid, aminocarboxylic acid having a substituted alkyl group, oxycarboxylic acid, benzoic acid or the like. The metal salts of organic carboxylic acids include Na, Mg, Ca, Zn, Al, Pb and Ba salts of the above mentioned carboxylic acids such as magnesium stearate, sodium oleate, magnesium naphthenate, sodium benzoate and the like. The metal salts of organic sulfonic acids contain Na, Mg, Ca, Zn, Pb, Al and Ba as a metal and include, for example, metal salts of alkylbenzenesulfonic acids having the general formula

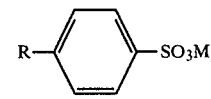

wherein R is an alkyl group of $C_{10} \sim C_{12}$ and M is a metal, and the like. The organic sulfates are defined by the general formula $ROSO_3M$ wherein R is an alkyl group of $C_{11} \sim C_{18}$ and M is a metal selected from Na, Mg and Ca. The aliphatic amines include, for example, amines having an alkyl substituent such as butyl, propyl, lauryl group or the like, polyoxyethylene laurylamines and polyoxyethylene stearylamines each containing an alkyl-substituted alkyl group, and the like. The alkanol amines include, for example, diethanol amine, dipropiol amine and the like. The alkanol amides of fatty acids include diethanol amide of coconut oil fatty acid, monoethanol amide of stearic acid, diethanol amide of lauric acid and the like. The fatty acid esters include polyethylene glycol oleic ester, polyethylene glycol stearic ester, sorbitan lauric ester, sorbitan stearic ester, sorbitan oleic ester and the like. The glycerol esters include oleic acid glyceride, stearic acid glyceride and the like. The metal salts of phosphoric acid contain Na, Ca, Mg, Zn, Al, Pb or Ba as a metal and include, for example, zinc phosphate and the like. The phosphoric acid esters include alkylphosphoric acid esters, potassium or sodium salts of alkylphosphoric acid esters and the like. The amine salts of phosphoric acid include ethylenediamine phosphate, propylethyleneamine phosphate and the like. The metal salts of hydrocarbon polymer oxides include, for example, metal salts of oxides of petrolatam, paraffin and the like and contain Na, Mg, Ca, Zn, Al, Pb, Ba or the like as a metal. The benzotriazole derivatives include chlorobenzotriazole, naphthotriazole and the like. The aliphatic ketones include acetylacetone and the like. The imidazole derivatives include alkylimidazoles and the like. The benzimidazole derivatives include alkylbenzimidazoles and the like. The amino acids include alkylalanines, alkylglycines and the like. These compounds may be used alone or in an admixture thereof as the surfactant.

The film-former to be used in the invention has a softening or melting point of not less than 30° C. and is composed essentially of at least one hydrocarbon polymers and oxides thereof such as wax, petrolatam, lanolin and oxides thereof. When the softening or melting point is not less than 30° C., the film formed on the surface of the steel cord merely softens even in summer season, so that there is no fear of causing the bonding between the mutual cords through the film, contamination of a reel and the like when the treated steel cords are wound on the reel or the like, or causing contamination of cords due to adhesion of foreign matter in the handling step because the film has not an extreme viscosity.

According to the invention, a weight ratio of the surfactant to the film-former is 1/10–3/1. When the weight ratio is smaller than 1/10, the amount of the surfactant becomes smaller and hence the rust preventing effect is insufficient, while when the weight ratio is larger than 3/1, the amount of the surfactant becomes larger and the amount of the film-former becomes smaller and hence the adhesion property to rubber is deteriorated.

In order to apply the rust preventing material consisting of the surfactant and the film-former to the steel cords, it is necessary to use the rust preventing materials as an oily material diluted with a solvent. In this case, it is desirable to properly adjust the physical properties of the oily material such as wettability, surface tension, viscosity, capillary rising action and the like from the following reasons. In the rubber articles such as pneumatic tires and the like to be used under dynamic conditions, the deterioration of performance and troubles were often observed though the occurrence of rust in steel cords was prevented and the adhesion to rubber was sufficient. This results from the fact that microscopic flaws are formed on the surface of the steel cord by a die or the like when the steel cords are usually manufactured through a severe working step such as a wire drawing step or the like and as a result, the pitting corrosion is generated from such flaws, resulting in the decrease of strength of steel cord and hence in the brittle fracture. Therefore, it is desired to protect the surface of the steel cord together with the microscopic flaws formed thereon. For this purpose, the wettability of the oily material becomes very important and is defined by a contact angle $\theta$ to the steel cord. In general, the larger the contact angle, the poorer the wettability. The contact angle $\theta$ must be not more than 10° for introducing the oily material into the flaws. In the conventional rust preventive, the contact angle $\theta$ is about 13° at minimum because spindle oil, wax, grease and the like are used as a base material, so that the wettability is still insufficient. On the contrary, the oily material according to the invention is used by adjusting the contact angle $\theta$ to not more than 10° during the dilution with the solvent.

In the wire drawing of the steel cord, a lubricant is frequently used as an aqueous solution, so that molecule of water is adsorbed on the surface of the steel cord. Particularly, it is anticipated that the molecule of water is firmly adsorbed on the flaw portion produced in the steel cord because that flaw portion is energetically active. Therefore, it is necessary that the surface tension of the oily material is made smaller than the surface tension of water of 72 dyne/cm, whereby the oily material is adsorbed on the surface of the steel cord in exchange for water. For this purpose, the oily material according to the invention has preferably a surface tension of not more than 40 dyne/cm. Regarding the viscosity, it has been confirmed that the lower the viscosity, the better the penetration of the oily material into the flaw but the smaller the amount of the oily material adhered, while the higher the viscosity, the larger the amount of the oily material but the worse the penetration of the oily material into the flaw. From the above, the viscosity is preferable within a range of 0.5 to 20 centistokes (cst) at room temperature.

The solvent to be used for diluting the rust preventing material according to the invention consists essentially of a petroleum cut, which includes kerosine, industrial gasoline, naphtha, spindle oil, dynamo oil, machine oil, cylinder oil and the like. These petroleum cuts may be used alone or in admixture of two or more petroleum cuts. By using such a solvent, the physical properties of the oily material are adjusted to predetermined values.

According to the invention, the rust preventing procedure using the above mentioned oily material is performed after the wire drawing of steel filaments. In this case, such a procedure is applicable to any of filaments, strands each composed of a plurality of filaments, and cords each composed of a plurality of filaments or strands.

According to the invention, the thickness of the protect layer is determined by the viscosity of the oily material, but it is desirable that the thickness is about 20μ at maximum in order to provide a good rust preventing performance and avoid the damaging of adhesion to rubber. Particularly, the protect layer is sufficiently resistant to the fretting as far as the weight ratio of the surfactant to the film-former is within the above mentioned range.

The steel cord to be used in the invention may take any of layer construction, strand construction, single layer construction, lang lay construction and the like. Furthermore, the surface of the steel cord may be plated with a metal selected from zinc and brass, which often contains nickel or cobalt.

The invention will now be described in detail with reference to the accompanying drawing, wherein:

A single FIGURE is a schematic radial half section of a tire for truck and bus having a tire size of 10.00R 20 used in an example of the invention.

The following examples are given in illustration of the invention and are not intended as limitations thereof.

EXAMPLE 1

An oily material having predetermined viscosity ($\eta$), surface tension ($\gamma$) and contact angle ($\theta$) as shown in the following Table 1 was prepared by diluting a rust preventing material shown in Table 1 with an industrial gasoline No. 4 according to JIS K-2201 (for rust preventing material No. 1-6 and No. 8-12) or a spindle oil No. 2 according to JIS K-2201 (for rust preventing material No. 7). Steel filaments after the wire drawing were treated with such an oily material and then formed into a steel cord having a layer construction of $3+9+15\times0.175+1$. Next, a plurality of the thus obtained steel cords were arranged parallel to each other and embedded in a rubber composition having a compounding recipe shown in the following Table 2. The vulcanization was carried out at 145° C. for 45 minutes to obtain a rubber laminate having a length of 200 mm, a width of 30 mm and a thickness of 4 mm. The adhesion and rust preventing performance of the resulting rubber laminate were measured to obtain a result as shown in Table 1. The measurements of these properties are as follows.

Adhesion (1) Initial adhesion:

A state of rubber adhered to the steel cords was observed after the steel cords were pelled off from rubber in the vulcanized rubber laminate. The adhered state is indicated by symbols A (100%, rubber is completely adhered to the whole surface of the steel cord), B (75%), C (50%), D (25%) and E (0%).

(2) Adhesion after heat aging:

The vulcanized rubber laminate was left to stand in a Geer thermostatic chamber at 120° C. for 7 days and then the adhesion was measured in the same manner as described in the above item 1).

(3) Waterproof adhesion:

The vulcanized rubber laminate was left to stand in a salt spraying equipment according to JIS Z-2371 at 35±2° C. with a concentration of sodium chloride of 5±1% and then the adhesion was measured in the same manner as described in the item (1). The measurement was performed after 10 and 30 days.

Rust preventing performance and corrosion fatigue resistance

The vulcanized rubber laminate was subjected to a repeated flexing deformation (flexing angle: 90°) in the salt spraying equipment under the same condition as described above and after 200,000 times of flexing, the steel cord was taken out from the laminate and the following tests were made thereto.

(1) State of rust occurrence:

The state of rust occurred in a core of the steel cord or a filament of a first sheath adhering no rubber was observed and indicated by symbols A (0%, no occurrence of rust), B (25%), C (50%), D (75%) and E (100%).

(2) Ratio of filament rupture:

In order to estimate a resistance to corrosion fatigue, number of filament ruptures at maximum deformation point was measured. As a result, a rupture ratio is indicated as a percentage.

(3) Retention of strength:

The strength of the steel cord was measured and indicated as a retention to the strength before the fatigue treatment.

Rust growth

After the flaw reaching to the steel cord was formed in the vulcanized rubber laminate, the same test as described in the rust preventing performance was repeated to measure a length of rust growing toward an axial direction of the steel cord. In this case, the flexing number was 50,000 times.

In Table 1, the thickness of the protect layer is a calculated value based on the amount of the rust preventing material adhered, density and treated area. In the oily material, $\eta$ was measured according to ASTM D-445 method, $\gamma$ was measured by using a CBUP surface tensiometer made by Kyowa Kagaku Co., and $\theta$ was measured by using a contact angle meter made by Kyowa Kagaku Co.

TABLE 1

| Rust preventing material No. | 1 | 2 | 3 | 4 | 5 | 6 | 7 | 8 | 9 | 10 | 11 | 12 |
|---|---|---|---|---|---|---|---|---|---|---|---|---|
| Surfactant (g, content in 100g of oily material) | Potassium alkylbenzene sulfonate (2g) | Sorbitan monooleate (2g) | Potassium alkylbenzene sulfonate (1.5g) | Stearic acid (2.5g) | Sorbitan monooleate (2g) | Sorbitan stearate (2g) | Sorbitan monooleate (5g) | | Stearic acid (15g) | Polyethylene glycol (molecular weight: 1000) (5.0g) | (non-treated) | Sodium laurylamino propionate (5g) |
| Hydrocarbon polymer (g, content in 100g of oily material) | Paraffin wax (2g) | Petrolatam (2g) Paraffin wax (5g) | Magnesium salt of oxide wax (1.5g) Paraffin wax (20g) | Magnesium salt of oxide wax (2.5g) Paraffin wax (35g) | Magnesium salt of oxide wax (3g) Petrolatam (50g) | | Paraffin wax (4.5g) | Paraffin wax (22g) | Zinc stearate (20g) | Petrolatam (40g) | | Oxide of paraffin wax (5g) |
| Properties of oily material | | | | | | | | | | | | |
| η (cst) | 1.0 | 2.0 | 5.0 | 8.0 | 15.0 | 0.5 | 45.0 | 6.0 | 8.0 | 9.0 | — | 17 |
| γ (dyne/cm) | 36 | 30 | 30 | 35 | 40 | 30 | 28 | 35 | 40 | 70 | — | 15 |
| θ (°) | 0 | 0 | 5 | 5 | 7 | 3 | 15 | 1 | 7 | 15 | — | 9 |
| Thickness of protect layer (μ) | 1 | 2 | 5 | 10 | 20 | 0.5 | 4.0 | 5 | 10 | 10 | — | 5 |
| Adhesion | | | | | | | | | | | | |
| (1) initial adhesion | A | A | A | A | A | A | A | A | C | A | A | A |
| (2) adhesion after heat aging | A | A | A | A | A | A | A | A | E | A | A | A |
| (3) waterproof adhesion | | | | | | | | | | | | |
| after 10 days | B | A | A | A | A | A | B | B | D | A | E | A |
| after 30 days | B | B | B | B | B | C | B | E | E | B | E | A |
| Rust preventing performance | | | | | | | | | | | | |
| (1) state of rust occurrence | A | A | A | A | A | D | D | E | D | B | E | A |
| (2) ratio of filament rupture (%) | 5 | 2 | 5 | 2 | 6 | 22 | 28 | 30 | 72 | 62 | 55 | 6 |
| (3) retention of cord strength (%) | 93 | 97 | 93 | 97 | 92 | 75 | 69 | 63 | 15 | 10 | 30 | 95 |
| Rust growth (mm) | 2 | 1 | 5 | 1 | 3 | 15 | 20 | 25 | 15 | 10 | 30 | 2 |

TABLE 2

| | (part by weight) |
|---|---|
| natural rubber | 100 |
| HAF carbon black | 60 |
| spindle oil | 5 |
| zinc white | 5 |
| sulfur | 6 |
| dicyclohexylmercaptobenzothiazol sulfenamide | 0.8 |
| stearic acid | 1 |
| N-isopropyl-N'-phenyl-p-phenylenediamine | 1 |

As apparent from Table 1, the rust preventing materials of the invention do not adversely affect the initial adhesion of rubber to steel cords and the adhesion after heat aging and considerably improve the waterproof adhesion. Further, the rust preventing performance and corrosion fatigue resistance are fairly improved.

EXAMPLE 2

A radial tire for truck and bus having a tire size of 10.00R 20 was manufactured by using steel cords treated with an oily material composed of the rust preventing material No. 1, 2, 4, 7, 10 or 11 of Table 1 as a reinforcement for a belt layer and a carcass layer, a radial half section of which tire 1 was shown in the accompanying drawings, wherein numeral 2 is a steel carcass layer, numeral 3 a steel belt layer, numeral 4 a bead wire, numeral 5 a chafer and numeral 6 a bead filler. The details of this tire were as follows.

| Carcass layer | 1 ply |
|---|---|
| steel cord used | 3 + 9 + 15 × 0.175 + 1 (layer construction) |
| end count | 14 cords/2.5 cm |
| Belt layer | 4 plies |
| steel cord used | 3+6×0.38 (strand construction) |
| end count | 14 cords/2.5 cm |

The tire of this type was mounted in a long-distance truck, provided that 300 cc of water was fed between a tube and an inside of the tire, and then run over a distance of 170,000 km. Thereafter, the adhesion, rust preventing performance and corrosion fatigue resistance of the tire were measured at 4 positions of the carcass layer in the circumferential direction thereof in the same manner as described in Example 1 to obtain a result as shown in the following Table 3.

TABLE 3

| Tire No. | 1 | 2 | 3 | 4 | 5 | 6 |
|---|---|---|---|---|---|---|
| Rust preventing material used No. | 1 | 2 | 4 | 7 | 10 | 11 |
| Results | | | | | | |
| Adhesion (after running) | B | A | A | B | B | C |
| State of rust occurrence | B | B | A | D | D | E |
| Ratio of filament rupture (%) | 4 | 4 | 3 | 19 | 18 | 25 |
| Retention of cord strength (%) | 92 | 92 | 95 | 77 | 76 | 70 |

From the results of Table 3, it can be seen that in the tire Nos. 4 and 5 treated with the oily material having the properties outside the ranges of the invention and the tire No. 6 not treated with the oily material, the filament rupture is caused due to the fretting and corrosion fatigue of the cord to considerably lower the strength of the cord, while in the tire Nos. 1-3 according to the invention, these properties are remarkably improved and the rust preventing performance is excellent.

EXAMPLE 3

The same tire as described in Example 2 was mounted in a truck for carrying limestones and macadams and run over a distance of 30,000 km. Thereafter, a degree of exposing the belt layer with the disappearance of rubber from the tread surface to the belt layer was measured as an exposure ratio of belt layer with respect to the tire suffering cut failure at the tread portion. Furthermore, the adhesion was measured at 4 positions of the belt layer in the circumferential direction thereof in the same manner as described in Example 2. The measured results are shown in the following Table 4.

TABLE 4

| Tire No. | 7 | 8 | 9 | 10 | 11 | 12 |
|---|---|---|---|---|---|---|
| Rust preventing material used No. | 1 | 2 | 4 | 7 | 10 | 11 |
| Results | | | | | | |
| Exposure ratio of belt layer (%) | 7 | 6 | 5 | 20 | 22 | 30 |
| Adhesion (after running) | B | A | A | C | C | C |

From the result of Table 4, it can be seen that the tire Nos. 7-9 according to the invention are excellent in the waterproof adhesion and rust preventing performance of the belt layer and have a good tread durability because of substantially no peeling of tread rubber from the belt layer.

What is claimed is:

1. A composite material of steel cords and rubber having improved corrosion fatigue resistance and fretting fatigue resistance, comprising on a surface of said steel cord a protect layer of a rust preventing material comprising at least one surfactant selected from the group consisting of metal salts of organic carboxylic acids containing magnesium, calcium or barium as a metal, metal salts of organic sulfonic acids containing magnesium, calcium or barium as a metal, metal salts of organic sulfates containing magnesium or calcium as a metal, metal salts of hydrocarbon polymer oxides containing magnesium, calcium or barium as a metal and sorbitan fatty acid esters, and at least one film-former selected from the group consisting of hydrocarbon polymers and oxides thereof having a softening or melting point of not less than 30° C. before vulcanization bonding of rubber to said steel cords.

2. A composite material as claimed in claim 1, wherein said rust preventing material comprises said surfactant and said film-former in a weight ratio of 1/10-3/1.

* * * * *

UNITED STATES PATENT AND TRADEMARK OFFICE
CERTIFICATE OF CORRECTION

PATENT NO. : 4,330,592
DATED     : July 7, 1980
INVENTOR(S) : Takehiro Tsukamoto et al It is certified that error appears in the above-identified patent and that said Letters Patent is hereby corrected as shown below:

On title page, first column, [30] second line, after "Japan" delete 54-857241 and insert --54-85724--.

Signed and Sealed this

First Day of January 1985

[SEAL]

Attest:

GERALD J. MOSSINGHOFF

*Attesting Officer*   *Commissioner of Patents and Trademarks*